(12) United States Patent
Escoto et al.

(10) Patent No.: US 11,904,354 B2
(45) Date of Patent: Feb. 20, 2024

(54) DEVICES AND METHODS OF FORMULATION APPLICATION TO WIPER BLADE AND WINDSHIELD

(71) Applicant: Illinois Tool Works Inc., Glenview, IL (US)

(72) Inventors: John Isidoro Escoto, Glenview, IL (US); Tze-Lee Phang, Glenview, IL (US); Jiafu Fang, Glenview, IL (US)

(73) Assignee: LLINOIS TOOL WORKS INC., Glenview, IL (US)

(*) Notice: Subject to any disclaimer, the term of this patent is extended or adjusted under 35 U.S.C. 154(b) by 600 days.

(21) Appl. No.: 16/984,505

(22) Filed: Aug. 4, 2020

(65) Prior Publication Data
US 2021/0039133 A1   Feb. 11, 2021

Related U.S. Application Data

(60) Provisional application No. 62/883,375, filed on Aug. 6, 2019.

(51) Int. Cl.
| B05D 7/02 | (2006.01) |
| B05C 1/02 | (2006.01) |
| C03C 17/32 | (2006.01) |
| B60S 1/38 | (2006.01) |

(52) U.S. Cl.
CPC ............... *B05D 7/02* (2013.01); *B05C 1/02* (2013.01); *B60S 1/38* (2013.01); *C03C 17/32* (2013.01); *B60S 2001/3829* (2013.01); *C03C 2217/76* (2013.01)

(58) Field of Classification Search
CPC .... B05D 7/02; B05C 1/02; B60S 1/38; C03C 17/32

USPC ............................................ 401/10
See application file for complete search history.

(56) References Cited

U.S. PATENT DOCUMENTS

| 5,860,182 A * | 1/1999 | Sareyani ............... B60S 1/0483 15/210.1 |
| 6,322,266 B1 * | 11/2001 | Traynor ................ A46B 5/06 15/160 |
| 9,056,987 B2 | 6/2015 | Sunder et al. |
| 9,540,552 B2 * | 1/2017 | Fang ..................... B60S 1/02 |

(Continued)

FOREIGN PATENT DOCUMENTS

| CN | 103025519 A | 4/2013 |
| CN | 103025520 A | 4/2013 |

(Continued)

OTHER PUBLICATIONS

Fengbi Liu, "Equipment Lubrication Technology Fundamentals," Sep. 30, 2012, pp. 68-69, South China University of Technology Press.

(Continued)

*Primary Examiner* — Jennifer C Chiang
(74) *Attorney, Agent, or Firm* — MaxGoLaw PLLC (57) ABSTRACT

A coating composition for imparting a hydrophobic film on a target surface is provided that includes a quaternary ammonium silane, a polyalkylene glycol, and an optional solid lubricant. A kit is also provided that includes an applicator having the above composition applied and instructions for the composition to a blade of a windshield wiper of a vehicle to impart the hydrophobic film to the vehicle windshield contacted by the blade.

18 Claims, 10 Drawing Sheets

(56) References Cited

U.S. PATENT DOCUMENTS

| | | |
|---|---|---|
| 9,631,120 B2 | 4/2017 | Iwazumi |
| 9,637,670 B2 | 5/2017 | Fang |
| 2002/0045010 A1 | 4/2002 | Rohrbaugh et al. |
| 2005/0096250 A1 | 5/2005 | Ohlhausen et al. |
| 2010/0234489 A1 | 9/2010 | Shimada |
| 2012/0070480 A1 | 3/2012 | Amos et al. |
| 2013/0045332 A1 | 2/2013 | Fang et al. |
| 2016/0194574 A1 | 7/2016 | Gross et al. |
| 2018/0237643 A1 | 8/2018 | Nowak et al. |
| 2022/0195204 A1 | 6/2022 | Fang |

FOREIGN PATENT DOCUMENTS

| | | |
|---|---|---|
| CN | 103118712 A | 5/2013 |
| CN | 104769088 A | 7/2015 |
| CN | 105102558 A | 11/2015 |
| CN | 105925388 A | 9/2016 |
| CN | 107099400 A | 8/2017 |
| CN | 114127201 A | 3/2022 |
| JP | 2011063794 A | 3/2011 |
| KR | 20190005573 A | 1/2019 |
| WO | 2011102939 A1 | 8/2011 |

OTHER PUBLICATIONS

1st Office Action issued in corresponding Chinese Patent Appln. No. 202080061963.6, dated Oct. 8, 2022.
Int'l Search Report for PCT/US2020/044964, dated Nov. 24, 2020.

* cited by examiner

DEVICES AND METHODS OF FORMULATION APPLICATION TO WIPER BLADE AND WINDSHIELD

RELATED APPLICATIONS

This application is a non-provisional application that claims priority benefit of U.S. Provisional Application Ser. No. 62/883,375 filed Aug. 6, 2019; the contents of which are hereby incorporated by reference.

FIELD OF THE INVENTION

The present invention in general relates to a hydrophobic coating composition for wiper blades imparting a hydrophobic film to a contacted windshield through wiper usage, and in particular to an applicator for transferring a hydrophobic coating composition to the wiper blade surface.

BACKGROUND OF THE INVENTION

Rain, sleet, and snow have always presented a vision problem for the operator of a vehicle. While mechanical movement of a wiper blade across a windshield is partly effective as a mechanical squeegee to displace water and snow from a windshield. The operation of a conventional wiper blade, regardless of whether made of carbon-base or silicone rubbers, is only partially effective in clearing water and snow from a windshield. A wiper blade moving across a windshield leaves a thin film of water that partly impairs vision and promotes adhesion of additional liquid water or snow to the windshield. Additionally, as a wiper blade undergoes degradation through exposure to the environment, the uniformity of wiper blade contact with the windshield is degraded. Additionally, debris that commonly adheres to the windshield creates regions in which wiper blade is gapped from the windshield surface leading to vision obscuring streaking and water droplets.

To address limitations of windshield cleaning through mechanical squeegee action, hydrophobic glass treatment solutions have been applied to automotive windshields to improve driver vision under high humidity conditions of rain, sleet, or snow. Representative of such glass treatments are those detailed in U.S. Pat. Nos. 3,579,540, 5,688,864, and 6,432,181. While such glass treatments are effective in rendering the windshield hydrophobic so as to cause water to bead and not form windshield water film, these products have met with limited acceptance owing to the labor-intensive application, and somewhat toxic chemicals needed to be handled to create a hydrophobic windshield surface. Additionally, the application of such hydrophobic glass treatments while a windshield is being subjected to rain or other precipitation is impractical.

In recognition of the limitations of conventional hydrophobic glass treatments, coating compositions have been developed for a wiper blade that include a silicone wax, a silicone oil in a solid lubricant such that the wax dissolves in the silicone oil such that during operation of the wiper blade, components of the coating layer are transferred onto a contacting windshield through the friction of the wiper blade against the windshield. Such a composition is detailed in U.S. Pat. No. 8,258,219. While such a coated wiper blade is effective in delivering a hydrophobic coating to a windshield upon wiper blade installation, the ability of the coating to be transferred to the windshield is rapidly degraded to the point where the ability to transfer coating components to a windshield significantly diminish in the time between wiper production and the actual installation of the blade on a vehicle. Additionally, the coatings imparted to a windshield tend to be irregular and create a mottled hydrophobicity.

U.S. Pat. No. 9,540,552 to the assignee of this application and incorporated herein by reference in its entirety teaches a coating composition for imparting a hydrophobic film on a target surface that includes an oil of a silicone oil or a fluoropolymer oil or a combination thereof, a resin, and a dry lubricant. A solvent is present to form a solution of the oil and resin. A coating is imparted to an applicator that in turn can transfer the coating as a hydrophobic film. The coating composition is stable and able to impart hydrophobic film even after storage for several weeks at elevated temperature. The coating composition does so through the exclusion of synthetic waxes especially including silicone waxes. A kit is also provided that includes a wiper blade having the above coating composition applied along with instructions for the securement of the wiper blade to a vehicle to impart the hydrophobic film to a vehicle windshield contacted by the wiper blade.

Furthermore, some related art shows wiper blades manipulated by trimming or removing layers from the wiper blade or in some cases abrading the surface of the wiper blades to renew the squeegee surface, thereby supposedly improving visibility during wiper blade operation.

With advancements in hydrophobic coating compositions there continues to be a need for improved devices and methods for applying these compositions to vehicle windshields. In addition, there exists a need for a wiper blade coating that has a long-lasting shelf life after application to the wiper blade as to allow the coated wiper blade to impart a hydrophobic film to the contacted areas of the windshield rapidly during wiper blade operation and even after a long storage duration of wiper blade coating composition, and even at elevated temperature. There further exists a need for a process of applying an inventive coating composition to a wiper blade and the subsequent transfer of coating composition components to a contacted windshield.

SUMMARY OF THE INVENTION

A coating composition is provided for imparting water repellency from a rubber element of automotive wiper blade to a windshield, the coating includes a quaternary ammonium silane, a polyalkylene glycol with molecular weight of 500 to 5,000, and an optional solid lubricant.

A kit is provided for producing a hydrophobic film on a surface, the kit includes an applicator having an applicator surface and a nonvolatile layer formed from the a composition as described above, the nonvolatile layer adhered to the applicator surface or applied thereto from a container; and instructions for contacting the applicator with a blade of a windshield wiper to impart the composition to the blade in order to produce a hydrophobic film having a water contact angle of greater than or equal to 60° C. on the surface.

A process of activating a windshield includes contacting the windshield with a wiper blade coated with a composition as described above, and wiping under wet, dry, or a combination of wet and dry conditions, the activation occurring in minutes or within 150 wipe cycles to a water repellency of more than 60 degrees of water contact angle to activate the windshield.

BRIEF DESCRIPTION OF THE DRAWINGS

The present invention is further detailed with respect to the following drawings. These figures are not intended to limit the scope of the present invention but rather illustrate certain attributes thereof.

FIGS. 11A-11E are a series of photos of a commercially available applicator assembly, in which FIGS. 11A-11D are prior art;

FIGS. 12A-12D are additional commercially available applicators for application of liquid solutions to a target surface in which FIGS. 12A-12D are prior art.

DESCRIPTION OF THE INVENTION

The present invention has utility as an applicator device and methods for using the applicator for applying a water repellant (WR) formulation to the blade of a vehicle windshield wiper for imparting a hydrophobic film to a contacted glass surface. While a water repellant coating is described herein, embodiments of the applicator device may also be used to apply other types of coatings illustratively including ultra-violet (UV), anti-glare, streak-free, low friction-no noise, anti-residue, and bug disintegration. The present invention improves visibility of poorly performing wiper blades as it cleans the squeegee and imparts the WR formulation to the blade surface. Embodiments of the present invention water repellant coating composition of the present invention provide excellent performance on silicon rubber and various non-silicone rubber materials commonly used in the wiper blade industry, including but not limited to, natural rubber, synthetic rubber such as CR rubber (chloroprene rubber), EPDM (ethylene propylene diene terpolymer) rubber, mixtures of natural and synthetic rubbers, silicone rubber, and mixtures of silicone rubber and non-silicone rubber. Embodiments of the inventive applicator device aid in the transfer of water repellency to the wiper blade then to the windshield for immediate use.

It is further appreciated that while the coating composition of the present invention is largely detailed with respect to windshields, it is appreciated that other suitable target surfaces of usage for the present invention illustratively include manual squeegees, vehicle rear windows, aircraft exterior surfaces, and other exterior surfaces where water repellency is desired. The present invention has the attribute of long term storage stability coupled with the ability to even after storage, impart a hydrophobic film to a contacted surface. While the present invention largely details the inventive coating composition as being applied to a surface via a wiper blade, it should be appreciated that an inventive coating composition is readily applied to a surface on which a hydrophobic film is desired with resort to other applicators illustratively including a buffing pad or cloth.

The present invention also provides a kit for producing a hydrophobic film on a surface. The kit includes an applicator having a nonvolatile layer of the coating composition adhered to the applicator, or the coating composition in a separate bottle for user application to the applicator; along with instructions for contacting the coated applicator with the target surface to produce a hydrophobic film on the surface with a water droplet contact angle of greater than or equal to 60 degrees with the contact angle being measured by ASTM C813.

Figure 1A:
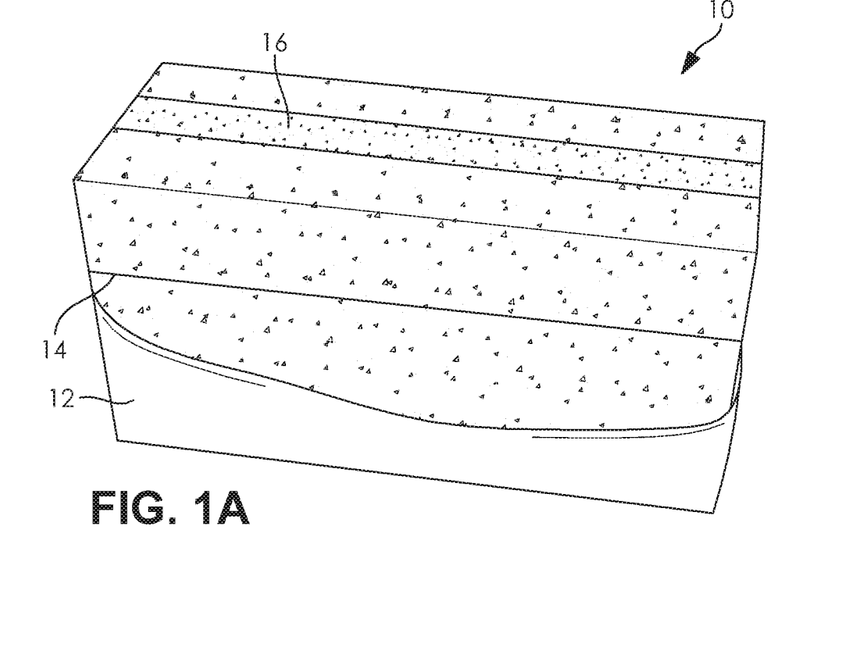
FIG. 1A is a perspective view of an applicator with a water repellant coating in accordance with embodiments of the invention.

Referring now to the figures, FIG. 1A is a perspective view of an applicator 10 with a handle 12 and a water repellant coating pre-applied in the channel or slot 16 of a substrate 14. The substrate 14 may be made of a woven or non-woven material illustratively including spunlace and melt blowing. In a specific inventive embodiment the substrate is created of polyester or polypropylene. Embodiments of the substrate may also be formed from silicone, polyurethane, nylon, neoprene, cellulose, PET, and wood pulp materials. Nonwoven fabric is a fabric-like material made from staple fiber (short) and long fibers, bonded together by chemical, mechanical, heat or solvent treatment, which are neither woven nor knitted. The spun-lace process is a nonwovens manufacturing system that employs jets of water to entangle fiber and thereby provide fabric integrity. Melt blowing is a fabrication method where a polymer melt is extruded through small nozzles surrounded by high speed blowing gas. The randomly deposited fibers form a nonwoven sheet product.

Figure 1B:
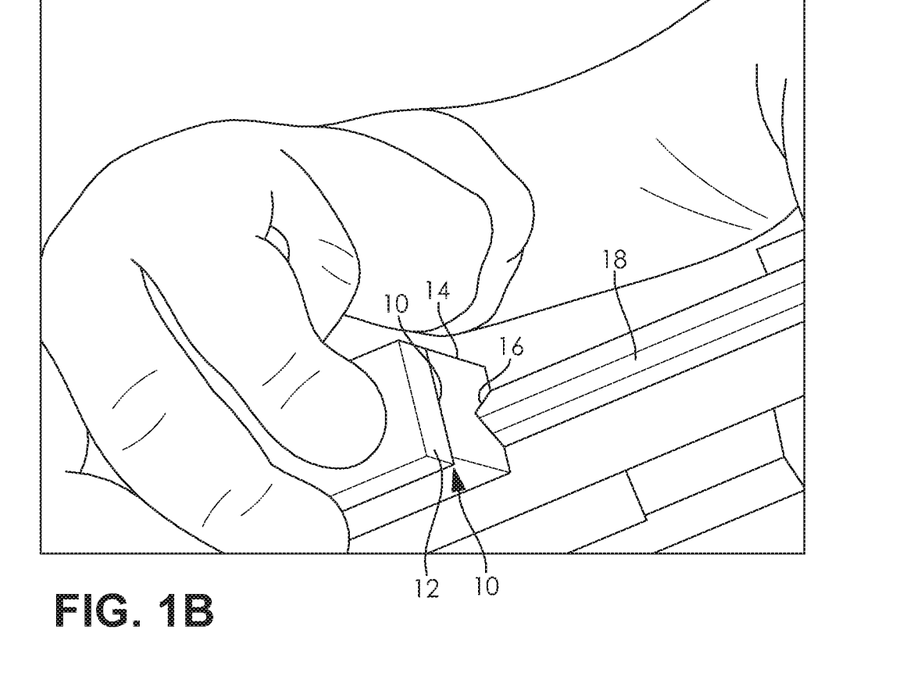
FIG. 1B illustrates the use of the applicator of FIG. 1A for imparting the water repellant coating to a wiper blade of a windshield wiper in accordance with embodiments of the invention.

FIG. 1B illustrates the use of the applicator 10 of FIG. 1A for imparting the water repellant coating to a wiper blade 18 of a windshield wiper. The user aligns the channel or slot 16 of the applicator 10 with the wiper blade 18 and runs the applicator 10 across the length of the blade 18 while applying steady pressure in order to transfer the water repellant coating to the wiper blade 18.

Figures 2A, 2B, 2C:
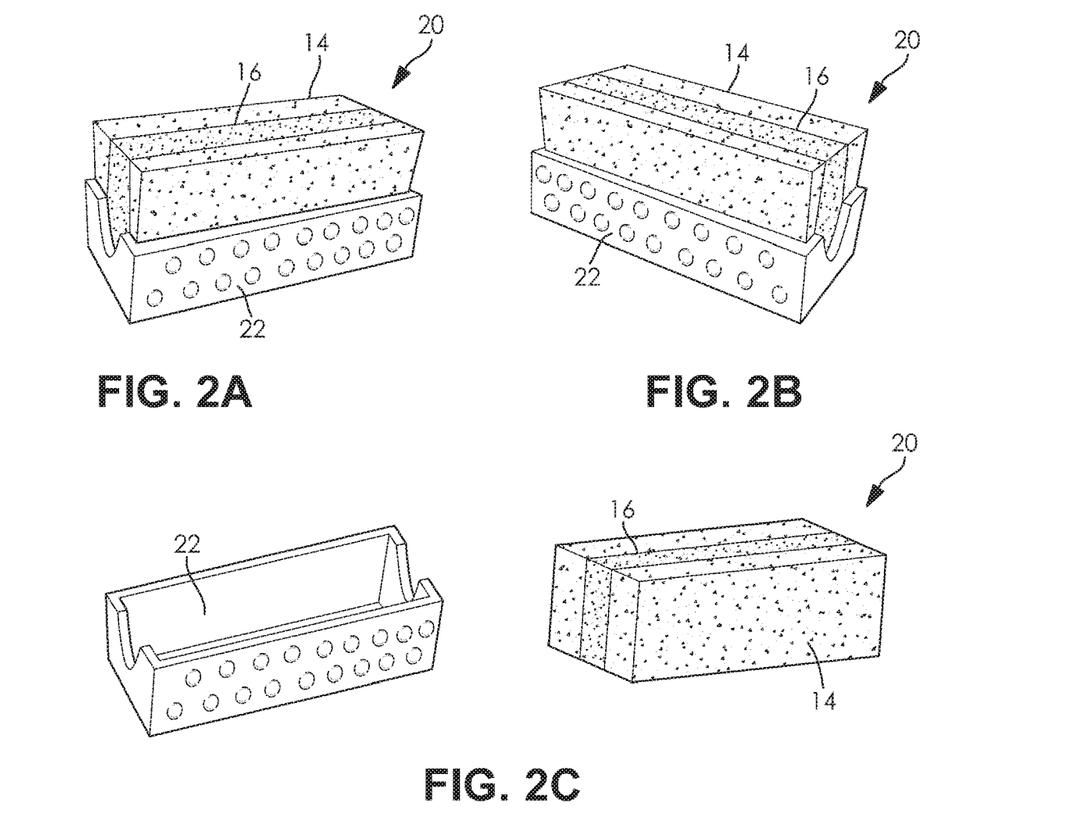
FIGS. 2A-2D illustrate a two-piece applicator configuration with a holder and substrate in accordance with embodiments of the invention.
Figure 2D:
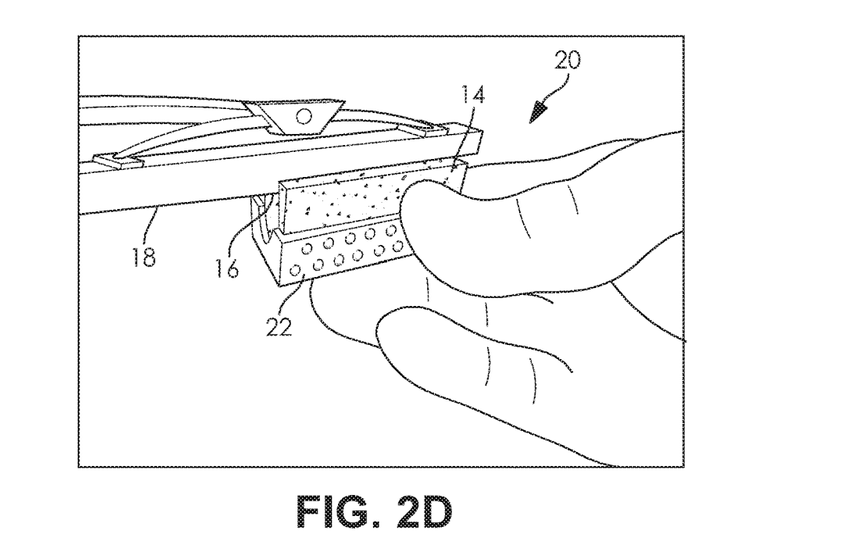

FIGS. 2A-2D illustrate an inventive embodiment of a two-piece applicator 20 with a holder 22 and a removable substrate 14 with a water repellant coating may be applied in the channel or slot 16 of a substrate 14. In a specific embodiment the water repellant coating may be pre-applied in the slot 16. As noted above, the substrate 14 may be made of a woven or non-woven material illustratively including spunlace and melt blowing. As shown in FIG. 2C, the holder 22 is separable from the substrate 14, and the holder 22 may be reused with different coated substrates. The holder 22 may be made of plastic, polymer materials, metal, or wood, and the holder 22 may be flexible or rigid. FIG. 2D illustrates the use of the applicator 20 for imparting the water repellant coating to a wiper blade 18 of a windshield wiper. The user aligns the channel or slot 16 of the applicator 20 with the wiper blade 18 and runs the applicator 20 across the length of the blade 18 while applying steady pressure in order to transfer the water repellant coating to the wiper blade 18.

Figure 3:
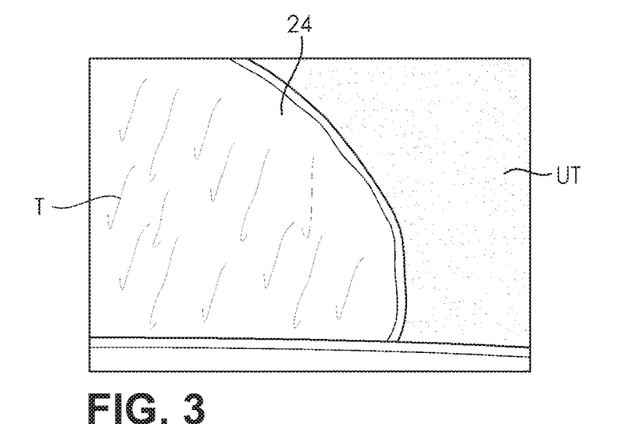
FIG. 3 illustrates the contrast between a portion of a windshield with an area treated with the inventive water repellant coating as transferred by a wiper blade, and a non-treated portion of the windshield.

FIG. 3 illustrates the contrast between a portion of a windshield 24 with an area treated T with the inventive water repellant coating as transferred by a wiper blade, and an untreated UT portion of the windshield with no repellency. As is readily evident the portion of the windshield that is treated T has improved visibility with water beading on the surface of the windshield 20.

Figure 4A:
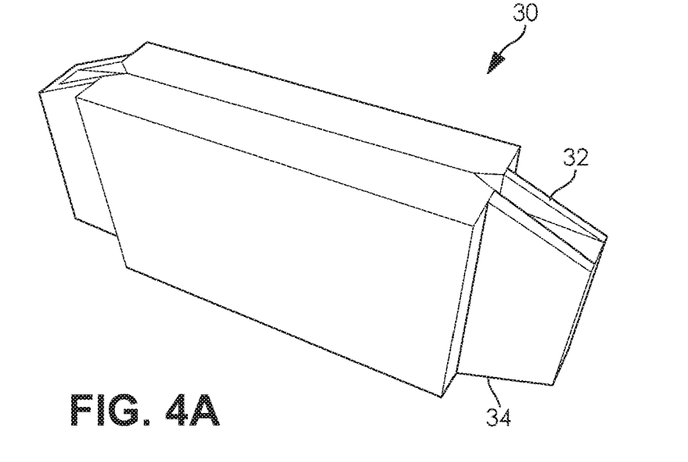
FIG. 4A is a perspective view of an applicator cartridge that cleans the wiper blade on one side and applies a water repellant coating from the other side of the applicator to blade in accordance with embodiments of the invention.
Figure 4B:
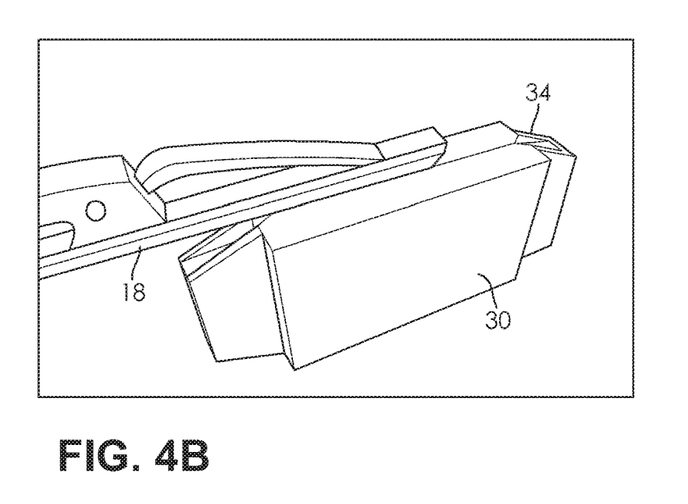
FIG. 4B illustrates the use of the applicator of FIG. 4A for imparting the water repellant coating to a wiper blade of a windshield wiper in accordance with embodiments of the invention.

FIG. 4A is a perspective view of an applicator cartridge 30 that cleans the wiper blade on one side 32 and applies a water repellant coating to the blade using the channel or slot 34 on the other side of the applicator 30. In specific inventive embodiments the water repellant coating is pre-applied to the channel or slot 34 of the applicator. FIG. 4B illustrates the use of the applicator of FIG. 4A for imparting the water repellant coating to a wiper blade of a windshield wiper. The user aligns the cleaning channel or slot 32 of the applicator 30 with the wiper blade 18 and runs the applicator 30 across the length of the blade 18 while applying steady pressure in order to clean the blade 18. The user subsequently transfers the water repellant coating to the wiper blade 18 by aligning the channel or slot 34 of the applicator 30 with the wiper blade 18 and runs the applicator 30 across the length of the blade 18 while applying steady pressure in order to transfer the water repellant coating to the blade 18 (as shown in FIG. 4B).

Figure 5A:
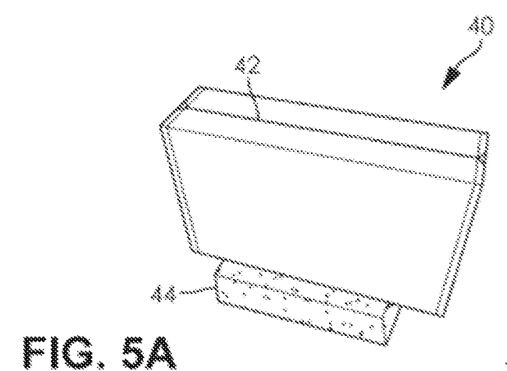
FIGS. 5A and 5B illustrate a water repellant applicator integrated with a windshield scrub pad in accordance with embodiments of the invention.
Figure 5B:
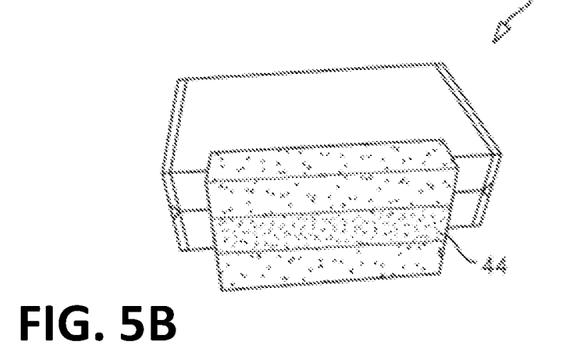

FIGS. 5A and 5B illustrate a water repellant applicator 40 integrated with a windshield scrub pad 44. The scrub pad 44 may be made of woven or non-woven materials as described with respect to the applicator substrate. In use, a user cleans the windshield with the scrub pad 44 and subsequently transfers the water repellant coating to the wiper blade 18 by aligning the channel or slot 42 of the applicator 40 with the wiper blade 18, and runs the applicator 40 across the length of the blade 18 while applying steady pressure in order to transfer the water repellant coating to the blade 18.

Figure 6A:
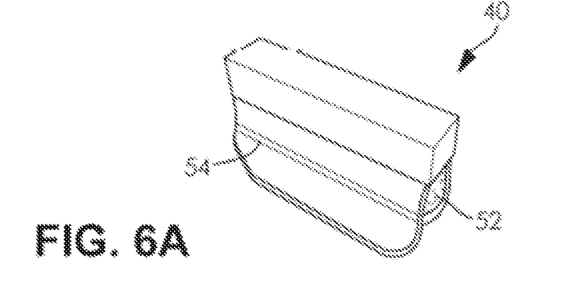
FIG. 6A illustrates a water repellant applicator with a tear away windshield cleaning foam in accordance with an embodiment of the invention.
Figure 6B:
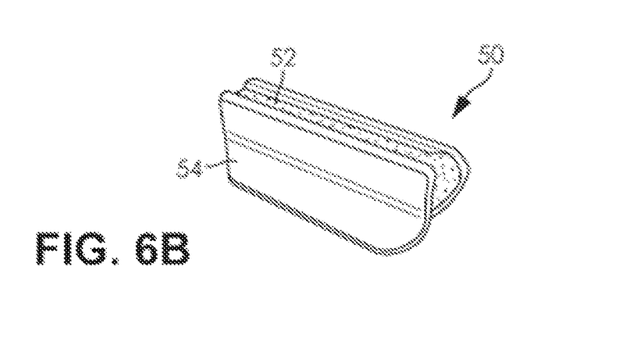
FIG. 6B illustrates the cleaning foam of FIG. 6A torn away to expose the applicator that is preloaded with a water repellant coating for application to a wiper blade.

FIG. 6A illustrates a water repellant applicator 50 with a handle 54 and a tear away windshield cleaning foam 56 that is positioned above an applicator substrate 52 that is pre-loaded with water repellant coating. FIG. 6B illustrates the cleaning foam of FIG. 6A torn away to expose the applicator substrate 52. In use, a user cleans the windshield with the cleaning foam 56, tears off the cleaning foam 56 to expose the applicator substrate 52, and subsequently transfers the water repellant coating to the wiper blade 18 by aligning the channel or slot in the applicator substrate 52 of the applicator 50 with the wiper blade 18 and runs the applicator 50 across the length of the blade 18 while applying steady pressure in order to transfer the water repellant coating to the blade 18.

Figure 7A:
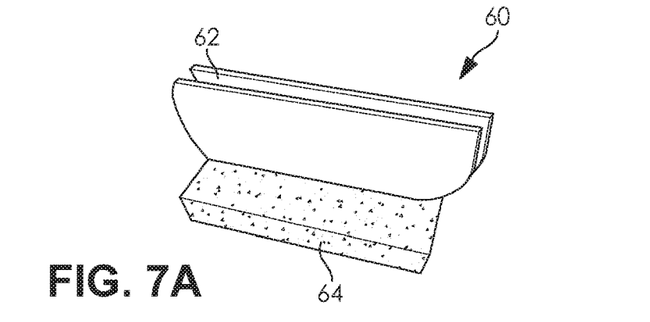
FIGS. 7A and 7B illustrate a three-in-one device that cleans the windshield, cleans the blade of the windshield wiper, and applies a water repellant coating to the wiper blade in accordance with embodiments of the invention.
Figure 7B:
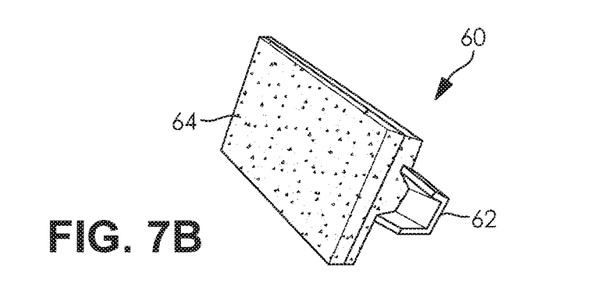

FIGS. 7A and 7B illustrate a three-in-one device 60 that cleans the windshield with a scrub pad 64, and also uses the applicator 62 to clean the blade of the windshield wiper while also applying a water repellant coating to the wiper blade.

Figure 8A:
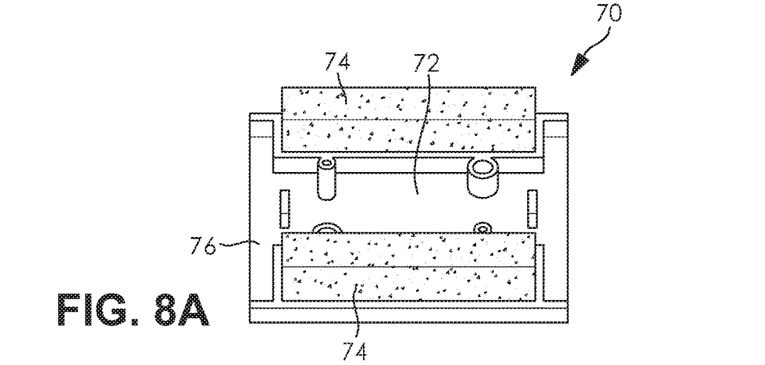
FIGS. 8A-8D illustrate an applicator cartridge that cleans the wiper blade and applies a water repellant coating to a wiper blade in accordance with embodiments of the invention.
Figure 8B:
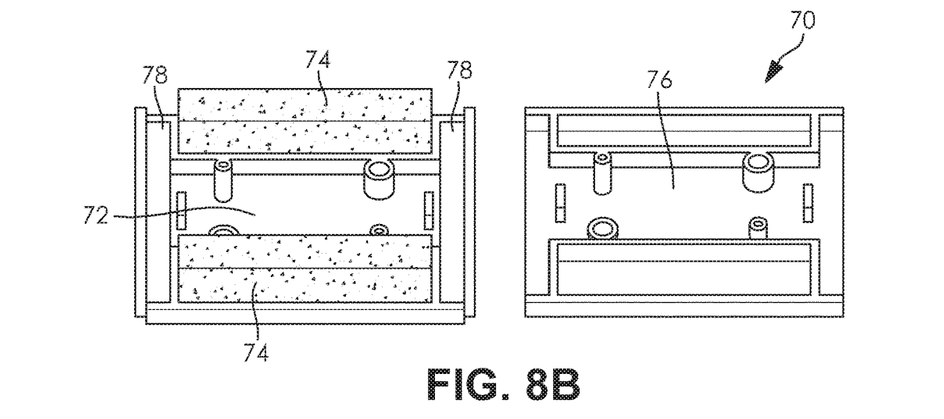
Figure 8C:
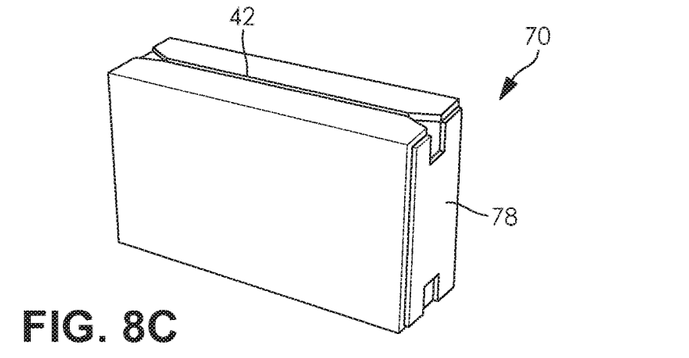
Figure 8D:
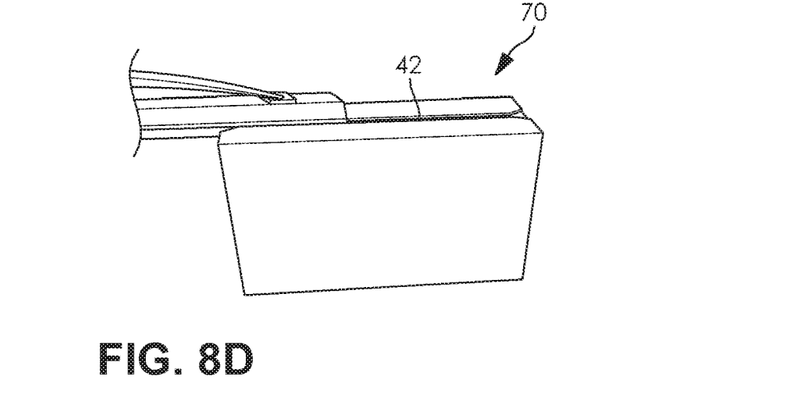

FIGS. 8A-8D illustrate an inventive embodiment of an applicator cartridge 70 that cleans the wiper blade and applies a water repellant coating to a wiper blade. As best shown in the disassembled view of the applicator cartridge 70 in FIGS. 8A and 8B, a bladder or pouch 72 within a shell casing 76 of the applicator cartridge 70 contains the water repellant coating. The bursting of the bladder or pouch 72 releases the water repellant coating into the applicator substrates 74. The bursting of the bladder or pouch 72 may be accomplished by pressing or piercing the bladder by applying pressure to the shell casings 76 that form the housing of the applicator cartridge 70. FIG. 8C illustrates an assembled applicator cartridge 70 with edge guides 78 for guiding a wiper blade into the slot 42 for applying the water repellant coating from the applicator substrates 74. FIG. 8D illustrates the transfer of the water repellant coating to the wiper blade 18 by aligning the channel or slot 42 of the applicator 70 with the wiper blade 18 and running the applicator 70 across the length of the blade 18 while applying steady pressure in order to transfer the water repellant coating to both sides of the blade 18.

Figure 9A:
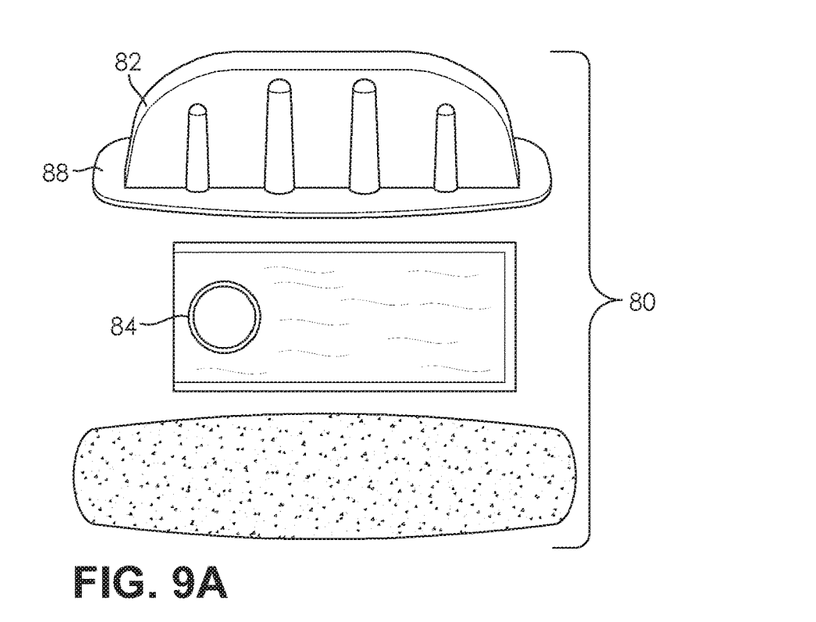
FIGS. 9A-9C illustrate an applicator for applying a water repellant coating to a surface in accordance with an embodiment of the invention.
Figure 9B:
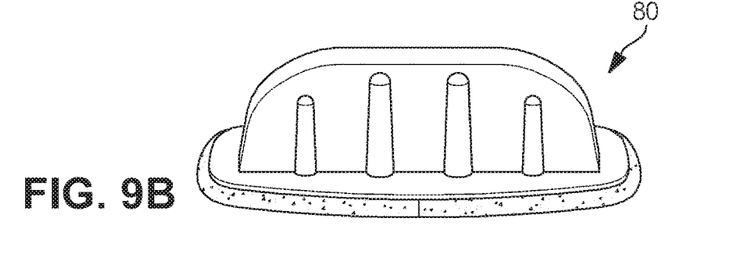
Figure 9C:
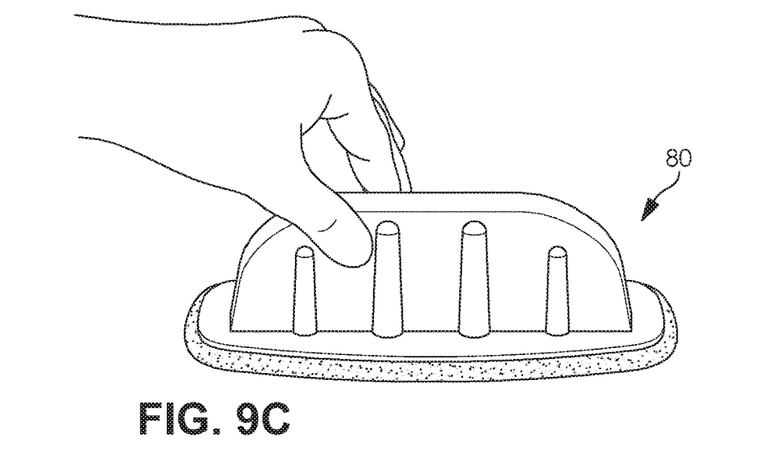

FIGS. 9A-9C illustrate an applicator 80 for applying a water repellant coating to a surface. As best shown in FIG. 9A in the exploded drawing of the applicator 80 of FIG. 9B, a bladder 84 fits in a cavity of a holder 82, and a foam substrate 86 is joined along the bottom perimeter lip or flange 88 of the holder 82. As shown in use in FIG. 9C, the application of pressure to the sidewalls if the holder 82 acts to burst, pierce, or puncture the bladder 84 inside the holder 82.

Figure 10A:
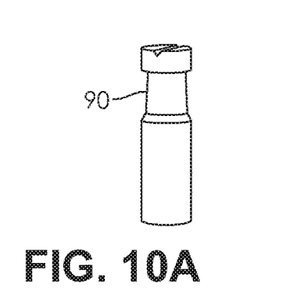
FIGS. 10A-10C illustrate an applicator tip for use with a vile, pouch, or squeeze bottle to apply a water repellant to a wiper blade in accordance with embodiments of the invention.
Figure 10B:
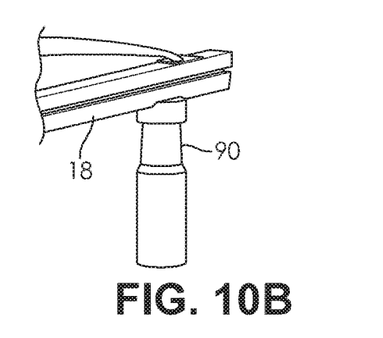
Figure 10C:
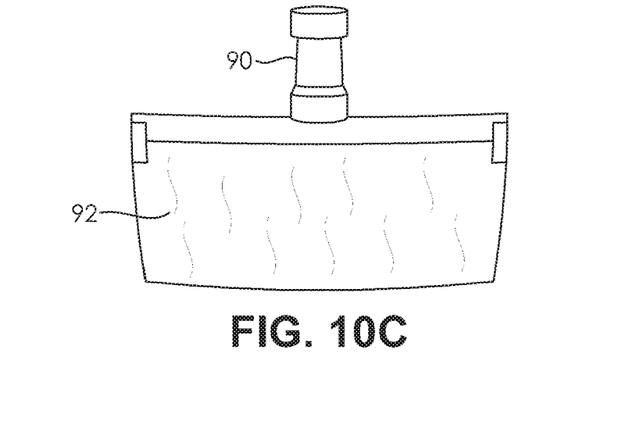

FIGS. 10A-10C illustrate an embodiment of an applicator tip 90 for use with a vile, pouch 92, or squeeze bottle to apply a water repellant to a wiper blade. FIG. 10B illustrates the transfer of the water repellant coating to the wiper blade 18 by aligning the applicator tip 90 with the wiper blade 18 and running the applicator tip 90 across the length of the blade 18 while applying steady pressure in order to transfer the water repellant coating to the blade 18. FIG. 10C illustrates a squeezable pouch 92 attached to the applicator tip 90.

Figure 11A:
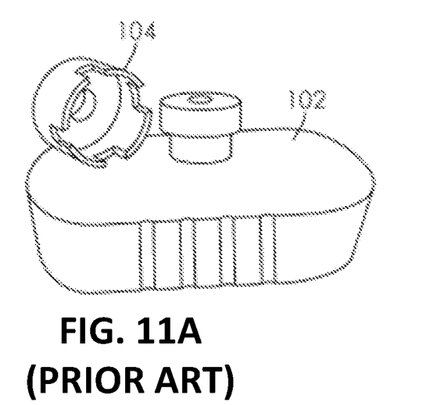
Figure 11B:
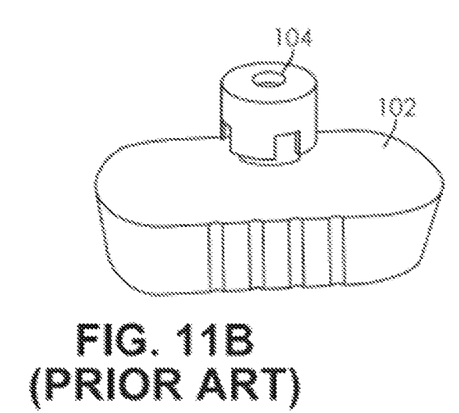
Figure 11C:
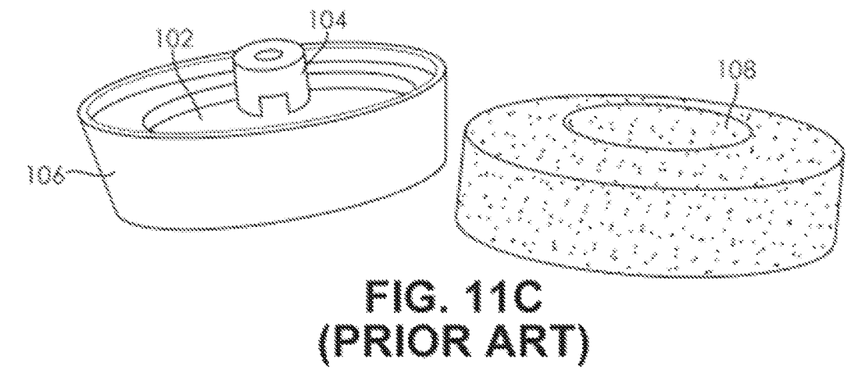
Figure 11D:
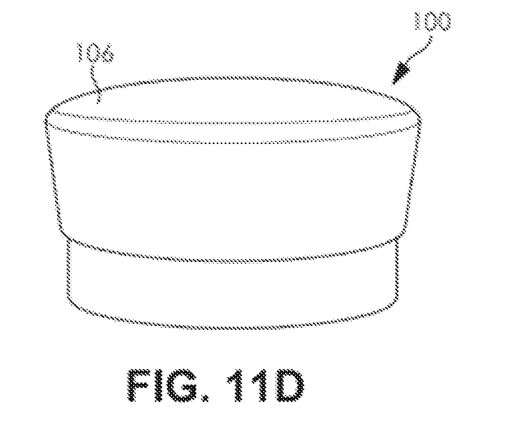
Figure 11E:
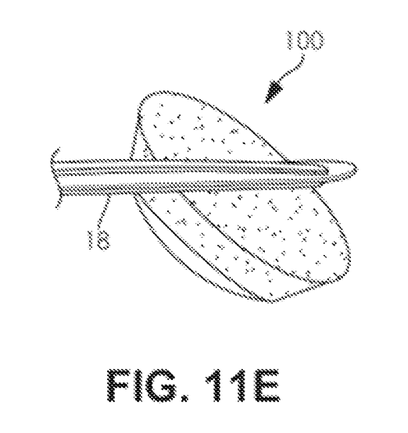

FIGS. 11A-11E are a series of photos of a commercially available applicator assembly 100. As best shown in FIGS. 11A and 11B a reservoir 102 has a piercing cap 104, which when pushed down open the reservoir 102 and allows the contents within the reservoir 102 to flow out. FIG. 11C is a disassembled view of the applicator assembly 100 that shows the reservoir 102 sitting within the housing 106, and a foam substrate 108 that disperses the contents of the reservoir 102 to a target surface. FIG. 11D shows the assembled applicator assembly 100, where pushing down on the housing 106 results in the piercing cap 104 puncturing the reservoir 102 and releasing the contents of the reservoir 102. FIG. 11E illustrate the use of the applicator assembly 100 for application of the water repellant coating to the blade 18.

Figure 12A:
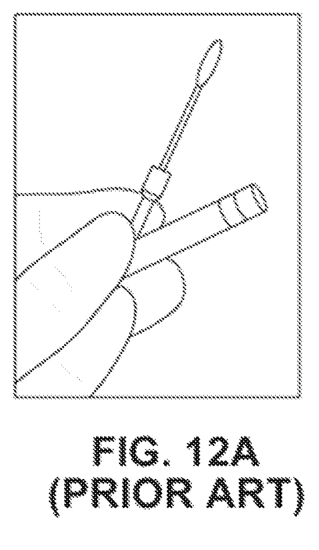
Figure 12B:
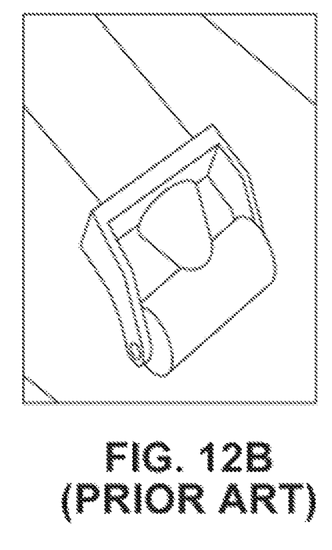
Figure 12C:
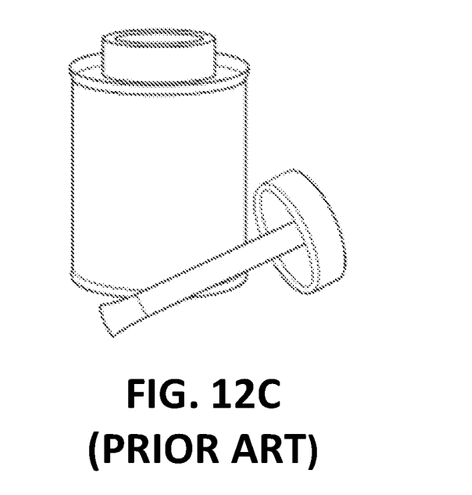
Figure 12D:
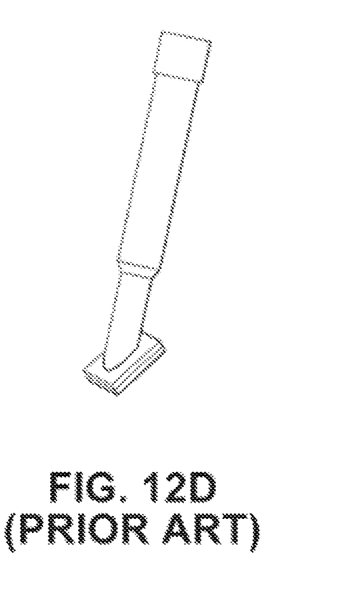

FIGS. 12A-12D are additional commercially available applicators for application of liquid solutions to a target surface. FIG. 12A shows a snap-able wetted swab, FIG. 12B is a roller applicator that is wetted by a squeeze bottle. FIG. 12C shows a dipped/screw-on top with a brush-on applicator. FIG. 12D shows a liquid filled plastic tube that flows into and through an applicator sponge tip.

A process for activating a windshield with a wiper blade applicator according to certain embodiments of the present invention is achieved by wiping the windshield under wet, dry, or a combination of wet and dry conditions to a water repellency of more than 60 degrees of water contact angle within minutes or 150 wipe cycles. In a specific embodiment the water-repellent coating activates in minutes following transfer from a wiper blade to the windshield. In still other embodiments, this degree of water repellency is achieved while maintaining a wipe quality that is within 90% or greater of that for an uncoated wipe blade otherwise identical to said wiper blade while the water repellency on the wiped windshield surface remains. Wipe quality is typically graded from a scale of 1 to 10, as defined, for example, by Akron Rubber Development Laboratory (ARDL), Inc. The present invention is thus shown to improve visibility of poor performing wiper blades as it cleans the squeegee and imparts the WR formulation to the blade surface.

Table 1 lists the major components of an embodiment of the inventive WR coating composition the resists absorption into rubber materials.

TABLE 1

Water Repellant Composition

| Ingredient | Wt % |
|---|---|
| Quaternary Ammonium silane | 5 to 95.0 |
| Polyalkylene glycol | remainder |
| Optional - solid lubricant | 0 to 40.0 |
| Total | 100.0 |

A quaternary ammonium silicone compound operative herein has the formulas:

$$[(RO)_{3-a}Si-R^2-N(R^1)(R^1)(R^3)] \ X^- \quad \text{(I), or}$$

$$(HO)_2-Si(R^4)-O-(R^4)Si-(OH)_2 \quad \text{(II)}$$

where R in each occurrence is independently $C_1$-$C_4$ alkyl, $R^4$, or H; a is an integer value of 0, 1, or 2, inclusive; $R^1$ and $R^2$ in each occurrence are independently $C_1$-$C_8$ alkyl or alkenyl groups; $R^3$ is a $C_1$-$C_{22}$ alkyl group; and X represents an anion, and includes $F^-$, $Cl^-$, $Br^-$, $I^-$, divalent and trivalent anions with the proviso that a salt is formed with the quaternary ammonium cation; and $R^4$ in each occurrence is $[N(R^1)(R^1)(R^3)] \ X^-$. It is appreciated that any alkyl or alkenyl moieties present in formula (I) can be linear or branched. It is further appreciated that any alkyl group having of at least C3 can further include a pendant group that serves to modify the solubility and filming forming properties. Pendant groups operative herein illustratively include —OH, —$SO_4^{-2}$, or —$SO_3^-$.

Exemplary quaternary ammonium silicones operative herein illustratively include: $(CH_3O)_3Si(CH_2)_3N+(CH_3)_2C_{18}H_{37}Cl-$, $(CH3CH2O)3Si(CH2)3N+(CH3)2C18H37Cl-$, $(CH3O)3Si(CH2)3N+(CH3)2C18H37Br-$, $(CH3O)3Si(CH2)3N+(C10H21)2CH3Cl-$ $(CH3O)3Si(CH2)3N+(CH3)2C14H29Cl-$, $(CH3O)3Si(CH2)3N+(CH3)2C14H29Br-$, $(CH3O)3Si(CH2)3N+(CH3)2C16H23Cl-$, and combinations thereof.

The polyalkylene glycol has a molecular weight of of between 500 and 5,000; without regard for the degree of branching. In some inventive embodiments, the polyalkylene glycol has a molecular weight of 1600±300.

As used herein, molecular weight refers to mass average molar mass, $M_w$.

An inventive coating composition also includes an optional particulate lubricant. The particulate lubricant in certain embodiments of the present invention has greater than 90 particle number percent of the particulate having a particle size smaller than 100 microns as determined by size guide number-(SGN). In still other embodiments of the present invention, 100 particle number percent are smaller than 100 microns. In still other embodiments of the present invention, the particulate has a mean particle size smaller than 50 microns. In certain embodiments of the present invention, a coating composition in solvated form is 1 to 10 total weight percent particulate lubricant. A particulate lubricant operative in the present invention illustratively includes graphite, turbostratic carbon, boron nitride, boric acid, and combinations thereof. In some inventive embodiments the particulate lubricant is only graphite.

The present invention is further detailed with respect to the following non limiting examples. These examples are not intended to limit the scope of the invention but rather highlight properties of specific inventive embodiments and the superior performance thereof relative to comparative examples.

EXAMPLES

Example 1

Figure 13:
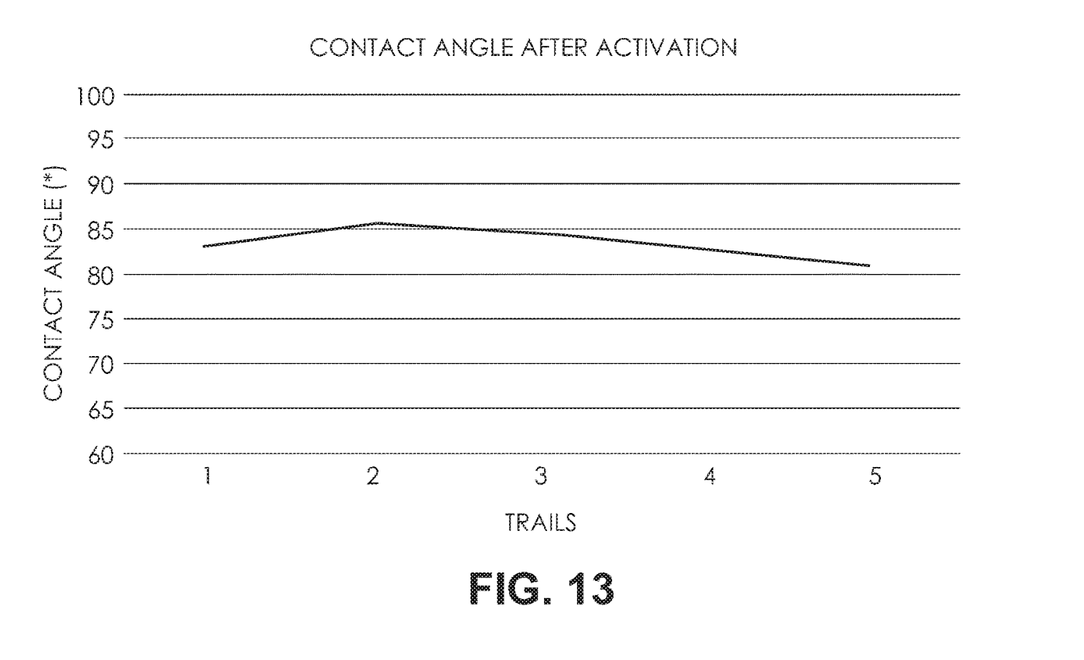
FIG. 13 is a plot contact angle of automotive windshield glass as a function of activation trials according to the present invention.

Using the article depicted in FIG. 2A and demonstrating methods in FIGS. 1B and 2D coating compositions are applied to chloroprene rubber-natural rubber (CR-NR) blended squeegees and the coated squeegees are wet to the touch (at least for this example) before WR activation test. The test results are shown in FIG. 13 for 5 duplication trials. The average water CA on the windshield increased from below 30 degrees before activation to more than 60 degrees after 150 wipe cycles using ASTM C813 to confirm measurement. These trials are performed in wet conditions to simulate inclement weather conditions.

Patents and publications mention the specification are indicative of the levels of those skilled in the art to which the invention pertains. These patents and publications are incorporated herein by reference to the same extent as if each individual patent or publication is specifically and individually incorporated herein by reference.

The forgoing description is illustrative of particular embodiments of the invention but is not meant to be a limitation upon the practice thereof. The following claims, including all equivalents thereof are intended to define the scope of the invention.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

The invention claimed is:

1. A kit for producing a hydrophobic film on a surface in contact with a blade of a windshield wiper, the kit comprising:
    an applicator having an applicator surface on a substrate and a nonvolatile layer formed on the applicator surface, the nonvolatile layer adhered to the applicator surface or applied thereto from a container;
    a slot or channel in said applicator surface of said substrate, said slot or channel configured to mate with the blade of the windshield wiper to impart the hydrophobic film to the blade; and instructions for contacting the applicator surface with the blade to produce hydrophobic film on the surface having a water contact angle of greater than or equal to 60°.

2. The kit of claim 1 wherein said applicator further comprises a cleaning slot or channel that cleans the blade of the windshield wiper.

3. The kit of claim 1 wherein said applicator further comprises a scrub pad to clean the surface.

4. The kit of claim 1 wherein the nonvolatile layer is non-drying and is transferrable from the applicator surface to a contacted surface by wiping.

5. The kit of claim 1 wherein the coated blade element of the windshield wiper is able to cause the surface to become hydrophobic after a number of wipe cycles either under dry, or wet, or combination of dry and wet condition.

6. The kit of claim 1 wherein the surface is a windshield.

7. The kit of claim 1 wherein the substrate is made of a woven or non- woven material.

8. The kit of claim 1 wherein the substrate is formed by spunlace or melt blowing.

9. The kit of claim 1 wherein the substrate is created of polyester or polypropylene.

10. The kit of claim 1 wherein the blade is formed of at least material of chloroprene rubber, natural rubber, or silicone or any combination of them.

11. A process of activating a water repellant on a windshield comprising:
  contacting with a blade of a windshield wiper with an applicator from the kit of claim 1; and
  wiping under wet, dry, or a combination of wet and dry conditions within minutes or 150 wipe cycles to a water repellency of more than 60 degrees of water contact angle to activate the windshield.

12. The process of claim 11 wherein said contacting further comprises:
  aligning a channel or slot of the applicator with the blade and running the applicator across a length of the blade while applying steady pressure in order to transfer the water repellant composition to the blade.

13. The process of claim 12 wherein said contacting further comprises:
  aligning a channel or slot of the applicator with the blade and running the applicator across a length of the blade while applying steady pressure in order to transfer the water repellant composition to the blade to simultaneously wipe clean the blade.

14. The process of claim 11 wherein said applicator further comprises a scrub pad and wherein said process further comprises cleaning the windshield with the scrub pad.

15. The kit of claim 1 wherein the nonvolatile layer comprises a quaternary ammonium silane, and a polyalkylene glycol with molecular weight of 500 to 5,000.

16. The kit of claim 15 further comprising a solid lubricant.

17. The kit of claim 16 wherein said solid lubricant is present from 0 to 40 total weight percent.

18. The kit of claim 15 wherein said polyalkylene glycol has a molecular weight of 1600±300 and is present from 5 to 95 total weight percent.

* * * * *